E. P. DEHLER.
COMBINATION FLY, ROACH, AND MOUSE TRAP.
APPLICATION FILED AUG. 25, 1910.
1,046,993.
Patented Dec. 10, 1912.
2 SHEETS—SHEET 1.
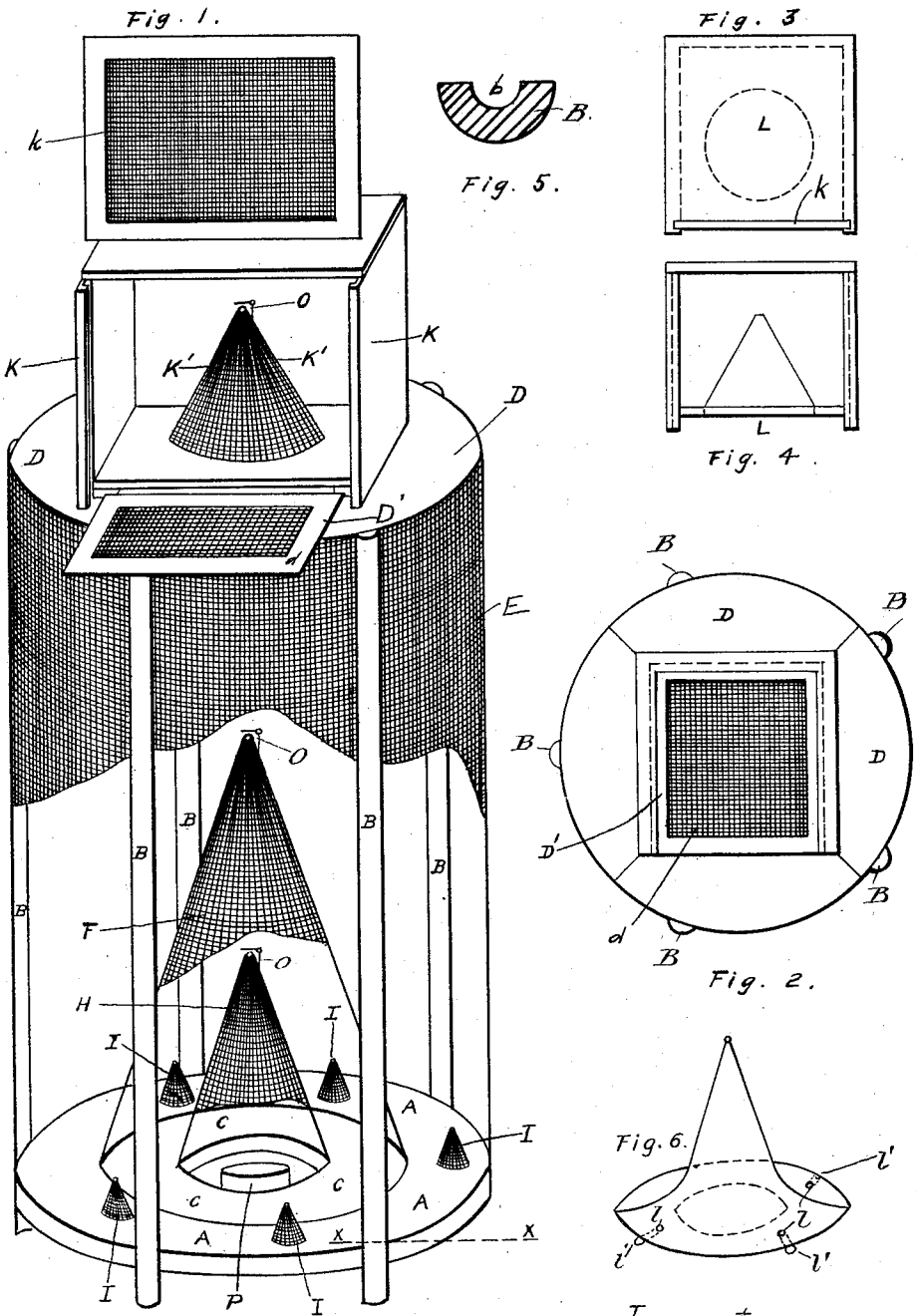
Witnesses.
N. J. Lomax.
E. O. Gibbons.
Inventor:
Edward P. Dehler
per
Eugene Ayres,
Attorney.

E. P. DEHLER.
COMBINATION FLY, ROACH, AND MOUSE TRAP.
APPLICATION FILED AUG. 25, 1910.
1,046,993.
Patented Dec. 10, 1912.
2 SHEETS—SHEET 2.
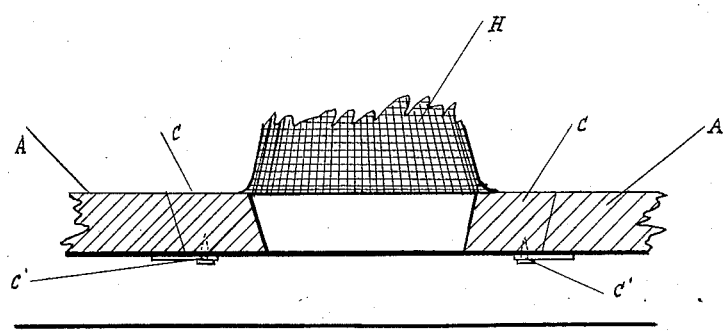
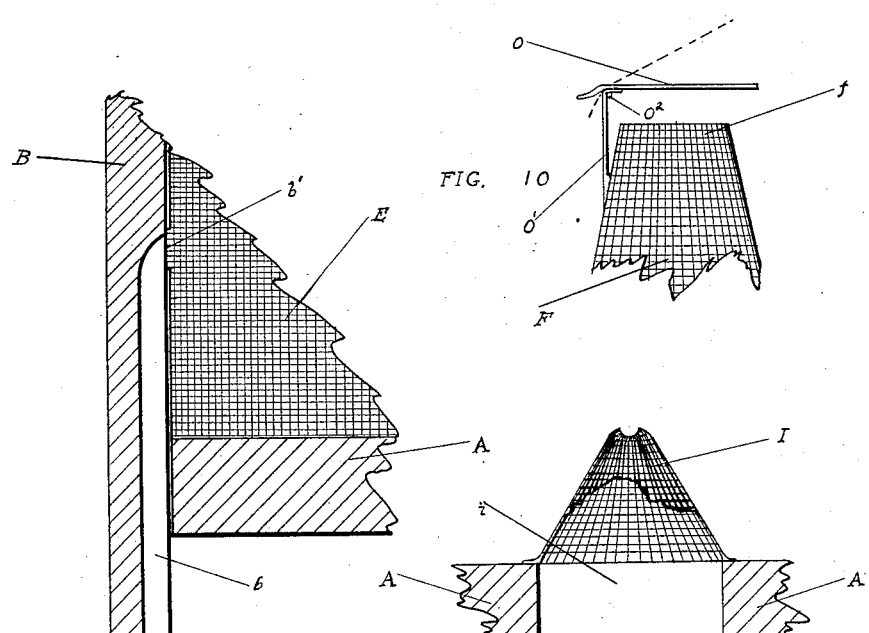

UNITED STATES PATENT OFFICE.

EDWARD P. DEHLER, OF ST. JOSEPH, MISSOURI.

COMBINATION FLY, ROACH, AND MOUSE TRAP.

1,046,993.      Specification of Letters Patent.      Patented Dec. 10, 1912.

Application filed August 25, 1910. Serial No. 578,835.

*To all whom it may concern:*

Be it known that I, EDWARD P. DEHLER, a citizen of the United States, residing at St. Joseph, in the county of Buchanan and State of Missouri, have invented certain new and useful Improvements in a Combination Fly, Roach, and Mouse Trap, of which the following is a specification.

My invention relates to improvements in a trap which being provided with any suitable bait is adapted to attract and catch either flies, roaches or other bugs, and mice, or that can be used for flies only, and which is provided with a chamber that may be removed and the contents destroyed without disturbing the trap chamber.

I accomplish my object by the construction shown in the accompanying drawing, in which,—

Figure 1 is a perspective of the entire device, the screening broken away to show the interior construction, the screened slide for the top of the trap drawn out of normal position and the emptying slide for one side of the death chamber box shown drawn out and set on top of the box; Fig. 2 is a top view of the trap with the sliding screen in closed position therein; Fig. 3 is a top view of a box on said trap that serves as a death chamber; Fig. 4 is a front view of the same; Fig. 5 is a cross section of upright leg cut at line X—X in Fig. 1; Fig. 6 is a modified form of the cone shaped wire screen showing tubular passages leading from beneath the floor up through holes therein; Fig. 7 is a cross section of an outer circular floor provided with an inner removable floor open at the center, a cone shaped screen, broken away, set over said open center; and Fig. 8 is a detail sectional view, broken away, showing an upright support, a floor, a screen attached to said upright, a spaced opening in said upright leading from the base of said upright and an opening in the screen by which a continuous passage from the base of said upright into the interior of said screen is formed; Fig. 9 is a detail of an opening in the floor and a miniature screen thereover, and Fig. 10 is a detail of a guard over an apex opening in a cone shaped screen.

Similar letters refer to similar parts in the several views.

In the drawings A represents a circular base or floor of the trap held somewhat elevated from the ground or floor by upright frame strips B B— which strips also serve as feet for the trap. The inner edge of circular base A is cut at an angle to permit the insertion of an inner circular floor C. The inner floor is held in position by bolts, buttons C' C', or other suitable means fastened to base or floor A at the lower edge of said cut angle as shown in Fig. 7.

D is the top of the trap provided with a slide frame D' which has a wire screen d.

Wire screening E incloses the entire trap chamber or body of the trap.

A cone shaped device F having a small opening f in its apex is attached at its bottom at the angle edge of floor A. A corresponding wire screen cone H of smaller dimensions than cone F with similar opening in its apex is fastened at its bottom to the inner edge of said floor C setting over the circular opening in said floor.

I I— are diminutive wire cone shaped screens set over holes i i— through which slots roaches and other bugs are attracted. These diminutive cone shaped screens are also provided with openings at their apices through which the bugs creep up into the large chamber.

$i^7$— is the dark tubular passage shown in Figs. 6 and 7 which may be inserted through hole i through which rodents or bugs may be the more readily attracted into the trap.

Uprights B B— are curved outward forming spaces b b, as shown in Fig. 5, to permit bugs to also creep up into the main chamber of the trap between said uprights B B— and the periphery of floor A. An insect entering a space b in an upright B at the base will crawl up space b until it has passed above the periphery of the floor of the device and thence farther up outside the screen until it reaches the top end of said space b at which point it will pass through an ingress opening b' in screen E as shown in Fig. 8; it will then crawl through said ingress opening b' entering the trap chamber formed by said screen E. The mice may be attracted by any suitable bait.

K is a box adapted to set on the top of the trap. It is also provided with a cone shaped screen K' with open apex. The bottom of said box has a central opening L, as shown in Fig. 3, over which said screen sets. The front of said box K has a slide k. Each of the cone shaped screens is provided with a fastened guard O, somewhat spaced from the apex, to prevent mice that have passed up through an apex returning and escaping. Flies and bugs are with but few exceptions disposed to climb upward after entering the trap.

P represents any suitable vessel in which to deposit bait to attract mice, flies, roaches, or other bugs into the trap.

When it is desired to destroy the flies or bugs that may have gathered in said trap it is only necessary to draw slide frame D' and screen d into the position shown in Fig. 1; the flies, etc., will speedily pass up through cone shaped screen K' into said box K. Slide frame D' may then be shoved back closing the top of the trap, box K lifted off top D and the mice, flies and bugs destroyed by plunging the box into hot water, or by any convenient means. Said front slide k is then removed and the contents of the box emptied, slide k is again inserted and the box is ready to be replaced on the trap.

It will be understood that if it is desired to use this device as a fly trap only the inner floor C with its cone shaped screen may be readily removed thereby increasing the space for the entrance of flies.

I desire to reserve the right to dispense with any of guards O O— and also with the cone shaped screen K' in the death chamber, and to make any minor, purely mechanical changes without interfering with the purpose of my invention.

What I claim and desire to secure by Letters Patent, is,—

1. The combination with a circular floor provided with an open center and a cone shape screen thereover, a plurality of openings around the same having cone shape screens thereover, a circular top with a screen slide therein and a surrounding screen with a plurality of openings, of a plurality of uprights extending below and supporting said floor and top and said surrounding screen, each of said uprights having a semi-circular space in its inner side extending from its base to a point above and engaging with an opening in said surrounding screen.

2. In a trap of the kind described, a floor having a plurality of openings and cone shape screens thereover their apices provided with guards, a top having a slidable screen, a screen forming an inclosed chamber having a plurality of side openings, a plurality of upright supports projecting below said floor supporting the top, the floor and surrounding screen of said chamber, said uprights each having a hollow space in its inner face extending from its base to a point engaging one of said side openings.

3. A trap comprising a circular floor provided with a plurality of openings, an inner detachable floor provided with a central opening, a top having a slidable screen, a surrounding screen secured to said floor and top forming a main chamber and having a plurality of openings in its side, a plurality of uprights extending below said floor and supporting said floor, top and screen, and provided with a semi-circular incurve extending from the base of each upright to engagement with one of said openings in the screen forming said main chamber, a detachable box on the top of said chamber and a cone shape screen therein set over the opening therein and the slidable screen below, a cone shape screen supported on the inner edge of said floor, a smaller cone shape screen supported at the inner edge of said inner detachable floor, a plurality of diminutive cone shape screens set over said openings in said floor and guards for the screens, the lower cone shape screen leading into the main chamber, thence through the top thereof into the cone shape screen in said detachable box and out into said detachable box.

In testimony whereof I affix my signature in presence of two witnesses.

EDWARD P. DEHLER.

Witnesses:
W. P. FULDPASOR,
H. F. OVERBECK.

Copies of this patent may be obtained for five cents each, by addressing the "Commissioner of Patents, Washington, D. C."